3,437,597
FERROELECTRIC CERAMICS
Pierre Auguste Marcel Belloc, Paris, France, assignor to Societe Anonyme: Societe Alsacienne de Constructions Atomiques de Telecommunications et d'Electronique "Alcatel," Paris, France, a corporation of France
No Drawing. Filed July 28, 1965, Ser. No. 475,570
Claims priority, application France, July 31, 1964, 983,866
Int. Cl. C04b 35/00; H01v 7/02
U.S. Cl. 252—62.9        12 Claims

ABSTRACT OF THE DISCLOSURE

Ferroelectric ceramic sodium-potassium niobates are provided with increased density and uniformity and with improved dielectric properties and reproducibility by replacing substantial small quantities of the alkalis—up to 5%—with magnesium.

---

This invention relates to improved ferroelectric ceramics, based on alkali metal niobates. It also relates to a method of manufacturing such ceramics.

The invention has in particular as object ferroelectric ceramics capable of being used for the manufacture of electromechanical converted elements having the most diverse forms, for example discs, plates, cylinders, spherical domes, and so on.

In addition to ferroelectric ceramics based either on barium titanate or lead titanozirconate, the interesting properties of niobates, particularly those of solid solutions of sodium and potassium niobates, have been known for some years. These solid solutions in fact have Curie points which may attain about 450° C., whereas barium titanate has a Curie point of only 120° C. It will, therefore, be realised that such solid solutions based on alkali metal niobates may be advantageous for the production of transducers intended to operate at high temperatures.

In order to manufacture such ceramic compositions, the starting materials are generally sodium carbonate ($Na_2CO_3$), potassium carbonate ($K_2CO_3$), and niobium pentoxide ($Nb_2O_5$). These products are mixed in suitable proportions to obtain the desired ceramic composition. Patent No. 2,976,246 to Egerton et al discloses that substantially the full range of potassium-sodium niobate ceramics exhibits ferroelectric within a specified temperature range. Specifically, compositions in the range from $K_{.9}Na_{.1}$ ($NbO_3$) to $K_{.1}Na_{.9}$ ($NbO_3$) are ferroelectric. The mixture is then calcined and ground, whereupon it is shaped according to a known technique. The resulting rough product is then baked so as to obtain the ceramic product, which is machined, the electrodes are applied to it, and it is polarised so as to activate the part.

Known methods of manufacturing such ceramics nevertheless have various disadvantages and yield products which have defective electromechanical properties or result in batches which have considerable dispersion of electromechanical properties in relation to one another. To be more precise, the utilisation of such processes has made it possible to discover the following major disadvantages:

(1) The density of the parts obtained is low and is very far from the theoretical density. There is consequently defective electromechanical activity due to the poor characteristics thus obtained.

(2) Electrical resistivity is likewise low and decreases very rapidly when the temperature rises.

Because of these two major disadvantages, it is impossible to obtain satisfactory polarisation of the parts. Ceramics are in fact obtained which have poor electromechanical characteristics and batches of parts have considerable dispersion of these electromechanical characteristics (dielectric constant, frequency constant, coupling coefficients, etc.) in relation to one another. Such dispersions may even be observed between parts from the same firing batch.

The invention has as object ferroelectric ceramic compositions having good electromechanical properties and capable of being manufactured in a reproducible manner; in other words, the dispersion of electromechanical characteristics between parts of the same batch or of different firing batches is low. The invention likewise relates to the process of manufacture of such compositions.

The invention shows that the substitution of magnesium atoms for some sodium and potassium atoms, preferably in a proportion ranging from 0 to 5%, in solid solutions of sodium and potassium niobates made it possible to obtain ceramics having the abovementioned improved properties.

The invention also shows that magnesium introduced in accordance with the abovementioned proportions makes it possible to obtain parts of suitable density and the resistivity of which has a fairly high value even at temperatures far higher than ambient temperature.

Magnesium used in such concentrations also provides the advantage of permitting polarisation to higher values of temperature and electric field; the finished part is thus provided with better mechanical properties.

The use of magnesium according to the above conditions thus supplies finished parts the longitudinal piezoelectrical constants $d_{33}$ of which may attain $400 \times 10^{-8}$ ues./dyne, whereas this same quantity is at most equal to $240 \times 10^{-8}$ for a composition the molar ratio $KNbO_3/NaNbO_3$ of which is equal to unity.

According to the invention the ceramic product utilised is essentially constituted by a basic solid solution composed of sodium niobate and potassium niobate, the molar ratio of these two constituents being preferably equal to unity.

According to the preferred embodiment of the invention this basic solid solution is modified by the substitution of magnesium for part of the alkali atoms, in a proportion ranging from 0 to 5%.

In order to prepare the ceramics of the invention it is recommended that use should be made of niobium pentoxide ($Nb_2O_5$), and potassium, sodium, and magnesium carbonates.

One process of manufacturing the ferroelectric ceramics of the invention is as follows.

The starting products are mixed in suitable proportions to obtain the desired percentages in the finished ceramic. Pre-baking is then effected at a temperature which may range from 850° to 1000° C. and is maintained for from 1 to 3 hours.

The resulting product is crushed and ground until a very fine powder is obtained. The rough parts are then shaped either by pressing the powder, which may be wetted with water, or by extrusion.

The rough products are then fired in an electric furnace at a temperature between 1000 and 1200° C., which is maintained for from 1 to 4 hours depending on circumstances. The speed of heating may vary from 25 to 200° C. per hour depending on the dimensions of the parts. The resulting parts are machined with diamond tipped tools to the desired dimensions, and then silvered.

The last stage of the process consists in imparting to these parts their piezeelectric properties in the known manner, that is to say applying an electric field which may range from 1200 to 2500 v. per mm., at a temperature of from 200 to 400° C. The ceramic material is then cooled to ambient temperature while remaining under the influence of the electric field.

Measurements may then be made 24 hours after polarisation.

The invention is illustrated, without in any way being limited, by the following example.

Example

| | G. |
|---|---|
| Niobium pentoxide | 545 |
| Sodium carbonate | 106 |
| Potassium carbonate | 138 |
| Magnesium carbonate | 4 | were mixed. The 4 grams of magnesium carbonate corresponds to about 1.2 atom percent of magnesium.

Pre-firing at 900° C. for 2 hours was first effected, whereupon the product was crushed and ground so as to obtain a very fine powder, after which a rough product of 20 x 20 x 20 mm. was manufactured by pressing and fired at 1120° C. in an electric furnace for 2 hours. The product was machined to 15 x 15 x 15 mm. and the piezoelectric properties were imparted to the part by polarising at 1800 v. per mm. at 300° C. and allowing to cool to ambient temperature while maintaining the electric field constantly. A longitudinal piezoelectric modulus $d_{33}$ of $380 \times 10^{-8}$ electrostatic units cgs. was thus obtained.

What is claimed is:

1. A ferroelectric ceramic material consisting essentially of a solid solution of 10 to 90% sodium niobate and 90 to 10% potassium niobate wherein a substantial part of the alkali metals up to 5% thereof has been replaced by magnesium, said part being sufficient to increase the density and uniformity and improve the reproducibility and dielectric properties of said ceramic.

2. A ceramic material according to claim 1 wherein the basic solid solution is substantially an equimolecular mixture of sodium niobate and potassium niobate.

3. A ceramic material according to claim 1 wherein a quantity of about 1.2 percent of the alkali atoms in the solid solution is replaced by magensium atoms.

4. A ferroelectric ceramic material constituted essentially by a solid solution of substantially an equimolecular mixture of sodium niobate and potassium niobate wherein a quantity of about 1.2 percent of the alkali atoms is replaced by magnesium atoms.

5. A process for manufacturing ferroelectric ceramics consisting essentially of a solid solution comprising 10 to 90% sodium niobate and 90 to 10% potassium niobate, wherein a substantial quantity of up to 5 percent of the alkali atoms is replaced by magnesium atoms, the said process consisting in intimately mixing the constituents; effecting a prefiring of the mixture at a temperature between 850° and 1,000° C.; crushing and finely dividing the material thus obtained; shaping and firing the material at a temperature between 1,000° and 1,200° C.; machining and silvering the resulting hard parts; imparting ferroelectric properties to said parts by applying a continuous electric field to them at a temperature of between 200 and 400° C. and allowing the said parts to cool to ambient temperature while maintaining the electric field, said quantity being sufficient to increase the densitity and uniformity and improve the reproducibility and dielectric properties of said ceramics.

6. A process according ot claim 5 wherein the value of said electric field is between 1200 and 2500 volts per mm.

7. A process according to claim 5 wherein the magnesium is introduced in the form of carbonate.

8. A process according to claim 5 wherein the niobium is introduced in the form of pentoxide $Nb_2O_5$.

9. A process according to claim 5 wherein the material is shaped by extrusion.

10. A process according to claim 5 wherein the material is shaped by pressing.

11. A process according to claim 6 wherein the magnesium is introduced in the form of carbonate and the niobium is introduced in the form of pentoxide $Nb_2O_5$.

12. A process according to claim 5 wherein the prefiring of the mixture is maintained for from 1 to 3 hours.

References Cited

UNITED STATES PATENTS

| 2,805,165 | 9/1957 | Goodman | 252—62.9 |
| 2,976,246 | 3/1961 | Egerton et al. | 252—62.9 |
| 3,222,283 | 12/1965 | Illyn et al. | 252—62.9 |

TOBIAS E. LEVOW, *Primary Examiner.*

ROBERT D. EDMONDS, *Assistant Examiner.*

U.S. Cl. X.R.

106—39